United States Patent [19]

Lee et al.

[11] 4,018,374
[45] Apr. 19, 1977

[54] METHOD FOR FORMING A BOND BETWEEN SAPPHIRE AND GLASS

[75] Inventors: Stuart M. Lee, Palo Alto; Jerrett D. Stafford, Sunnyvale, both of Calif.

[73] Assignee: Ford Aerospace & Communications Corporation, Dearborn, Mich.

[22] Filed: June 1, 1976

[21] Appl. No.: 691,913

[52] U.S. Cl. .............................. 228/121; 228/116; 228/124
[51] Int. Cl.² .......................................... B23K 1/20
[58] Field of Search .......... 228/121, 122, 124, 116; 65/43

[56] References Cited
UNITED STATES PATENTS

| | | | |
|---|---|---|---|
| 3,107,756 | 10/1963 | Gallet | 228/122 X |
| 3,418,423 | 12/1968 | Bronnes et al. | 228/122 X |
| 3,747,173 | 7/1973 | Lind | 228/121 X |
| 3,798,746 | 3/1974 | Alphonse et al. | 228/116 |
| 3,857,161 | 12/1974 | Hutchins | 228/121 |
| 3,921,885 | 11/1975 | Knox | 228/121 X |

*Primary Examiner*—Al Lawrence Smith
*Assistant Examiner*—K. J. Ramsey
*Attorney, Agent, or Firm*—Robert W. Brown; Keith L. Zerschling

[57] ABSTRACT

Method for forming a bond (hermetic seal) between sapphire and glass. In the preferred form of the invention, the sapphire and glass surfaces to be bonded each have applied to them thin films of chromium, copper, nickel and gold. The inner chromium film is several hundred angstroms thick, the copper and nickel films have a total thickness of about 10,000 angstroms and together comprise an intermediate film, and the outer gold film is about 20,000 angstroms thick. The thin films are applied in a vacuum by direct evaporation or vapor plating or by sputtering. A bond or hermetic seal is effected between the gold films on the respective sapphire and glass materials. An indium wire is inserted between the gold films and a clamping force is applied to the sapphire and glass materials to cause the indium wire to deform to increase substantially the indium surface area. In a vacuum, heat is applied to the sapphire, glass and indium materials sufficient to cause the indium to liquify. After a time period, for example, 15 to 20 minutes, the heat is removed and the liquified indium is allowed to solidify. The resulting bond is particularly suitable for use in forming a hermetic seal between the sapphire faceplate and glass envelope of a cathode ray tube.

14 Claims, 2 Drawing Figures

METHOD FOR FORMING A BOND BETWEEN SAPPHIRE AND GLASS

BACKGROUND

This invention relates to a method for forming and bond (hermetic seal) between sapphire and glass. More particularly, the invention relates to a method for forming a bond between a sapphire faceplate and a glass envelope of a cathode ray tube.

Attempts to form a bond between sapphire and glass have been unsuccessful, especially with respect to the application of these material in a cathode ray tube as indicated above, because of the extreme mismatch of coefficients of linear expansion of the two materials. Sapphire has a coefficient of linear expansion of about $55 \times 10^{-7}/°$ C. and 0120 lead glass, a glass typically used in the manufacture of cathode ray tubes, has a coefficient of linear expansion of about $89 \times 10^{-7}/°$ C. In order for a cathode ray tube (CRT) to operate, very low absolute pressure (high vacuum) is required within the CRT.

Sapphire is a very desirable material for use in the faceplate of a CRT because of its heat dissipation capability. However, the low absolute pressure and high temperatures encountered in the CRT require that a metal or glass bond be formed between the sapphire and glass to satisfy the hermeticity requirement of the CRT application. Indium has been found to be a metal particularly suitable for effecting the necessary seal between the sapphire and glass because indium is a soft, pliable metal that yields, or, plastically deforms, under stress, thereby to minimize the accumulation of stress at the seal location. In addition, because indium has a melting point at about 152° C., the sapphire and glass materials may be joined at or near this low temperature.

A sapphire CRT faceplate is a large, single-crystal element that has a critical temperature, between 1,000 and 3,000° C., wherein extreme care must be taken to prevent its being cracked. This and other factors preclude the formation of direct sapphire-to-glass bonds, as can be obtained where both of the materials being sealed are glass. Thus, seals formed by conventional techniques employing the use of grit, flanges, grading, involving a gradual transition between dissimilar materials, and brazing are unsatisfactory for use with sapphire and glass. Also, specific prior art methods for forming bonds between dissimilar metals, such as those methods described in U.S. Pat. Nos. 3,590,467 to Chase et al, 3,798,746 to Alphonse et al and 3,747,173 to Lind, have proven unsatisfactory in connection with attempts to form a bond or hermetic seal between sapphire and glass for CRT applications.

SUMMARY OF THE INVENTION

According to the invention, a method is provided for forming a bond (hermetic seal) between sapphire and glass and, particularly, between a sapphire faceplate and a lead glass envelope of a CRT. On the surfaces of the sapphire and glass to be bonded together, inner, intermediate and outer thin metal films are applied. Between the outer film on the sapphire surface and the outer film on the glass surface, a metal wire is inserted and a force is applied to the sapphire and glass materials sufficient to cause the metal wire to deform plastically such that its area is substantially increased, and preferably, at least doubled.

Preferably, indium wire is used between the outer films on the sapphire and glass. Indium has been known as a material for use in forming a seal between dissimilar materials, both crystalline and noncrystaline, but oxidation on the surface of the indium or other metal material employed to effect the seal has been a problem. The plastic deformation of the metal wire according to the present method, in a manner to increase substantially the surface area of the wire employed, provides unoxidized surface area in the plastically deformed material used to form the seal. Of course, with the present method, the freshly exposed surface area resulting from the wire deformation is located between the respective outer films on the sapphire and glass materials and is not readily subject to atmospheric contamination.

Preferably, the inner, intermediate and outer films are applied to the sapphire and glass surface areas to be bonded by direct evaporation, in a vacuum, in accordance with well known techniques. Preferably, identical film materials are used on the sapphire and glass surfaces to be bonded, and the respective inner films are chromium, the intermediate films are comprised of layers of copper and nickel, and the outer films are gold.

The invention may be better understood by reference to the detailed description which follows and to the drawings.

Figure 1:
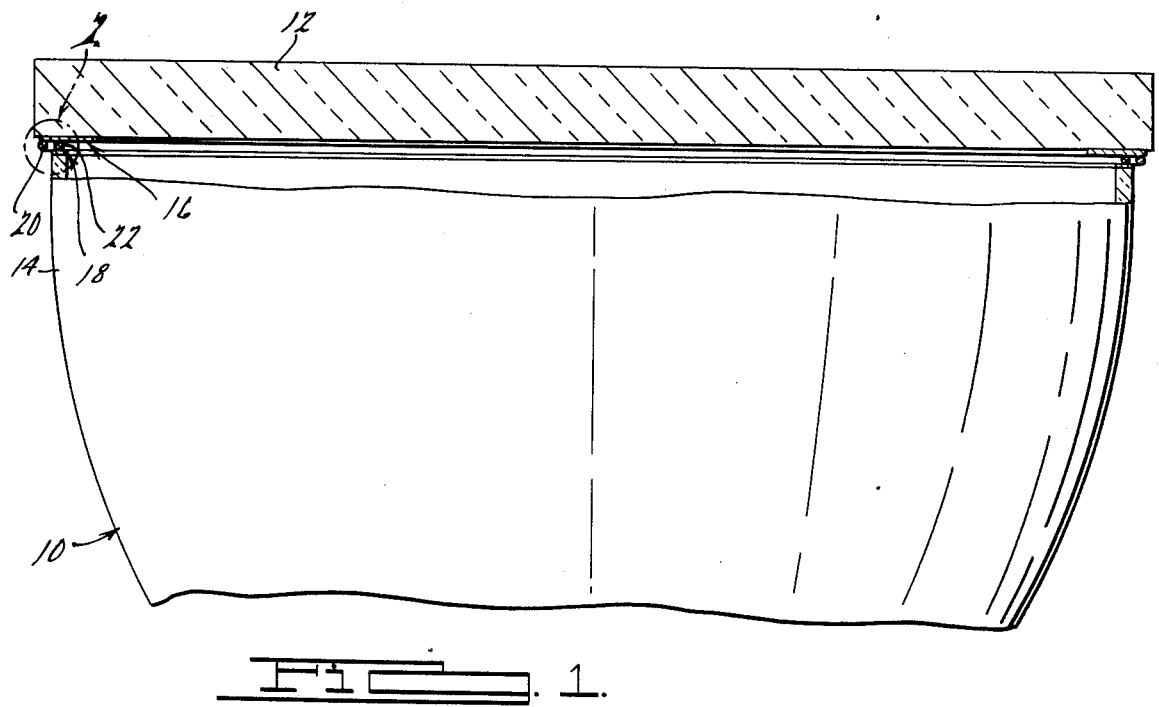
FIG. 1 is a plan view, partially in section, of a CRT illustrating the method by which a seal is effected between a portion of the surface of its sapphire faceplate and the lip of its lead glass envelope.
Figure 2:
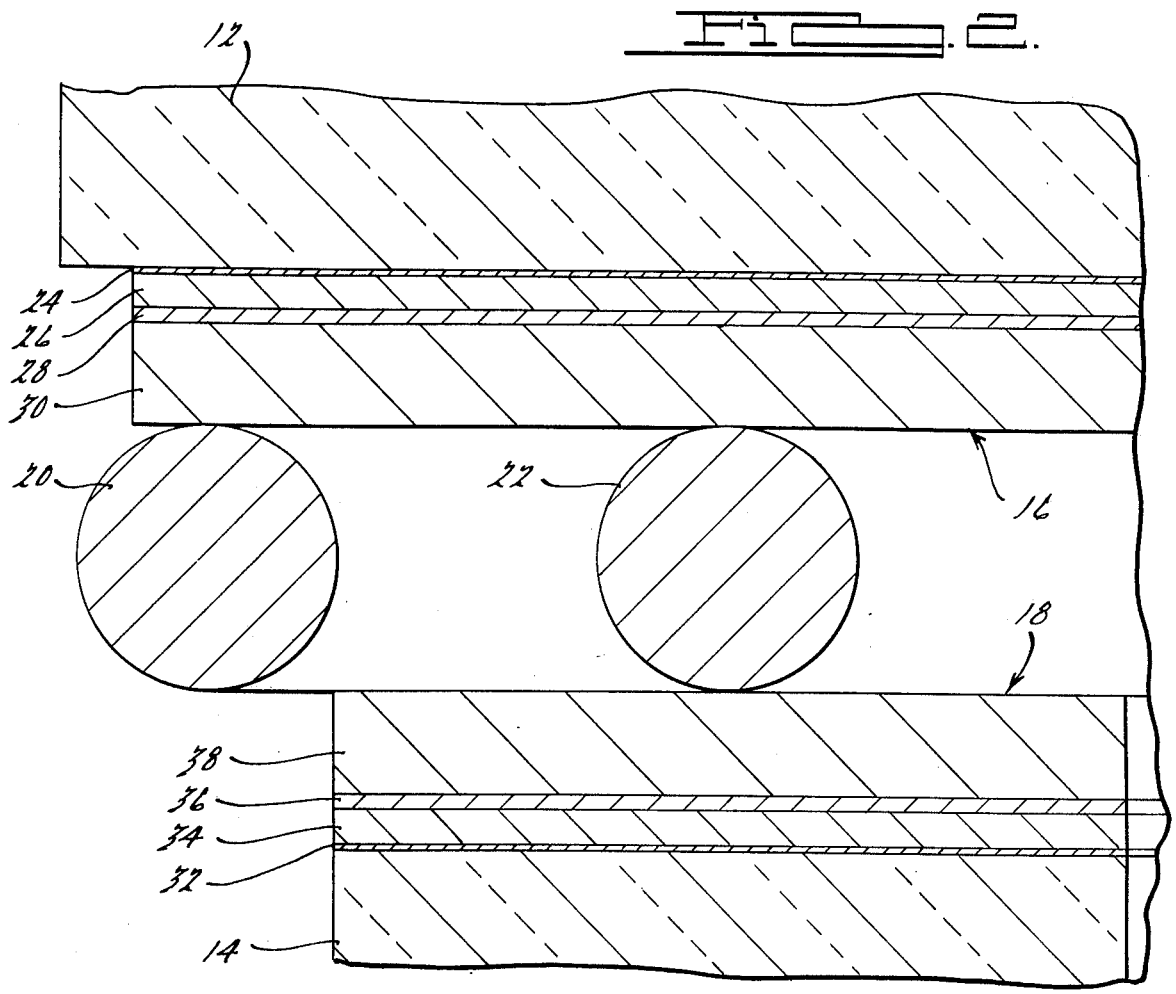
FIG. 2 is an enlarged sectional view of the region indicated by the broken-line circle designated by the numeral 2 in FIG. 1 and illustrates the materials used in effecting the bond between the sapphire and glass in the CRT of FIG. 1.

The dimensions of the materials illustrated in FIGS. 1 and 2 are, in some places, exaggerated to facilitate a better understanding of the invention.

DETAILED DESCRIPTION

With reference now to the drawings, wherein like numerals refer to like parts in the two views, there is shown a round CRT 10 having a faceplate 12 and an envelope 14. The faceplate 12 is made of sapphire, preferably single crystal and one-quarter inch thick, and the glass envelope 14 preferably is the 0120 lead glass (containing potash, soda and lead) typically employed in CRTs. The envelope 14 may have a wall thickness of approximately one-eighth inch.

The invention provides a method and associated means for effecting a bond or hermetic seal between the sapphire faceplate and the circular edge, or lip, at the open end of the glass envelope 14. For this purpose, several metallic films, collectively indicated by the numeral 16, are deposited on the radially outer portion of the inner surface of the CRT faceplate 12, and several metallic films, collectively indicated by the numeral 18, are deposited on the circular lip of the glass envelope 14. These aligned metallic films 16 and 18 have metallic wires 20 and 22 located between them. In effecting the bond between the sapphire faceplate and the glass envelope, the metal wire 22 is of greater significance than is the metal wire 20, the latter being provided primarily to produce a metal fillet between the sapphire faceplate and the outer edge at the lip of the glass envelope. The metal wires 20 and 22 preferably are made of indium that has been cleaned with hydrochloric acid or other material suitable for removing some of the oxide and other contaminants from the wire surface. However, the deformation of the metal wire 22 in the manner hereinafter described is of perhaps much greater significance in exposing unoxidized material in the metal wire 22 to permit its bonding to the metal films 16 and 18. The inventors have used metal wires 20 and 22 of 0.045 inch diameter, which when placed between the sapphire faceplate and the lip of the glass envelope as shown in the drawings, are overlapped by about 0.005 of an inch.

With particular reference to the enlarged view of FIG. 2, it may be seen that the metal films 16 include an inner metal film 24 that is applied to the surface of the sapphire faceplate 12 to be bonded to the lip of the glass envelope 14. This film 24 may be applied to the faceplate 12, in a vacuum, by evaporative deposition or by sputtering or other techniques known in the art. Evaporative deposition is the preferred technique in applying this metal film 24 and the other metal films hereinafter described. An intermediate film, comprising metal layers 26 and 28, is applied to the exposed surface of the inner metal film 24. Similarly, an outer metal film 30 is applied to the exposed surface of the intermediate metal film.

Preferably, the inner metal film 24 is chromium having a thickness of several hundred angstroms. The intermediate film consists of a copper layer 26 and a nickel layer 28; the thickness of the layers 26 and 28 together may total 10,000 angstroms with the copper layer 26 being considerably thicker than the nickel layer 28. In an alternative form of the invention, the intermediate film comprising layers 26 and 28 may be replaced by a simultaneously deposited film of copper and nickel, thereby, to form a copper-nickel alloy. The outer film 30, applied to the exposed surface of the intermediate film, is gold in a preferred thickness of 20,000 angstroms. Thus, the gold film 30 is about twice the thickness of the intermediate film, illustrated in FIG. 2 as the copper and the nickel layers 26 and 28, respectively.

The films 18 on the lip of the glass envelope 14 preferably are identical to the corresponding films on the sapphire surface. Thus, film 32 is chromium several hundred angstroms thick, the intermediate film comprises layers 34 and 36 of copper and nickel, respectively, and the outer film 38 is gold about 20,000 angstroms thick, twice the thickness of the intermediate film.

After the metal films are applied to the surfaces of the sapphire and glass to be bonded together, a force is applied to the sapphire and glass causing the indium wires 20 and 22 to deform plastically, preferably such that the surface area of the indium wire 22 is at least doubled. This substantial increase in the surface area of the indium wire 22, resulting from the application of the force to the sapphire and glass, is desirable so that material of wire 22 previously unexposed to the atmosphere contacts the metal films 16 and 18. A balance must be effected between the indium wire diameter, the amount of indium required to satisfactorily alloy with the fold films 30 amd 38, the width of the surface areas to be bonded and the desired final thickness of the various metals between the surfaces of the sapphire and glass. The deformation of the indium wire 22 places unoxidized wire material in direct contact with the gold films 30 and 38 and this contact tends to prevent further oxidation.

After insertion of the indium wires 20 and 22 between the respective gold films 30 and 38 on the sapphire and glass surfaces to be bonded, heat is applied to the sapphire and glass and, particularly to the indium wires 20 and 22, in an amount sufficient to cause the indium to liquify. The melting point of indium is approximately 152° C., but it is preferred that the assembly depicted in the drawings be heated, with the aforementioned force applied to it, so that a temperature of from 200° to 220° C. is maintained on the sapphire faceplate for 15 to 20 minutes. Preferably, the heat is applied while the CRT assembly is located in a vacuum, and an evacuated bell jar may be used for this purpose. The heat may be applied by means of a bank of quartz lamps. Of course, other heating means may be employed.

The use of the process described above has resulted in bonds or hermetic seals, containing excellent indium fillets, that have passed a leak test of $10^{-10}$ torr using a Veeco MS-9 leak detector to measure the leakage.

Based upon the foregoing description of the invention, what is claimed is:

1. A method for forming a bond between sapphire and glass comprising the steps of:
    1. with respect to the surface of the sapphire to be bonded to the glass:
        a. applying an inner film of metal, capable of adhering to sapphire, on said sapphire surface;
        b. applying an intermediate film of metal on the exposed surface of said inner metal film;
        c. applying an outer metal film on the exposed surface of said intermediate metal film;
    2. with respect to the surface of the glass to be bonded to the sapphire:
        a. applying an inner film of metal, capable of adhering to glass, on said glass surface;
        b. applying an intermediate film of metal on the exposed surface of said inner metal film;
        c. applying an outer metal film on the exposed surface of said intermediate metal film;
    3. placing a metal wire between said outer metal films on said sapphire and glass surfaces and applying a force to said sapphire and glass sufficient to deform plastically said metal wire to increase substantially its surface area;
    4. applying heat to said metal wire sufficient to cause it to liquify while said force is being applied; and
    5. allowing the liquified metal to solidify.

2. A method according to claim 1 wherein said metal wire is an indium wire.

3. A method according to claim 2 wherein said inner films on said sapphire and glass surfaces are chromium and wherein said outer films are gold.

4. A method according to claim 3 wherein each of said intermediate films on said sapphire and glass surfaces comprises two metallic elements.

5. A method according to claim 4 wherein said two metallic elements of said intermediate films are copper and nickel.

6. A method according to claim 5 wherein each of said intermediate films on said sapphire and glass surfaces is formed by the deposition of a layer of copper on each of said chromium inner films and by the deposition of a layer of nickel on each of said copper layers.

7. A method according to claim 6 wherein said films are applied in a vacuum to said sapphire and glass surfaces, wherein said step of applying heat to said indium metal wire is carried out with said indium metal wire and said sapphire and glass surfaces to be bonded located in a vacuum, and wherein the sapphire is maintained at a temperature in excess of the melting point of indium for at least 15 minutes.

8. A method for forming a bond between sapphire and glass comprising the steps of:
1. with respect to the surface of the sapphire to be bonded to the glass, and with said sapphire surface in a vacuum:
   a. applying a film of chromium on said sapphire surface;
   b. applying an intermediate film, comprised of copper and nickel, on the exposed surface of said chromium film;
   c. applying a film of gold on the exposed surface of said intermediate film;
2. with respect to the surface of the glass to be bonded to the sapphire, and with said glass in a vacuum:
   a. applying a film of chromium on said glass surface;
   b. applying an intermediate film, comprised of copper and nickel, on the exposed surface of said chromium film;
   c. applying a film of gold on the exposed surface of said intermediate film;
3. placing an indium wire between said gold films on said sapphire and glass surfaces to be bonded and applying a force to said sapphire and glass sufficient to deform plastically said indium wire to increase substantially its surface area;
4. applying heat to said sapphire, glass and indium wire sufficient to cause said indium wire to liquify while said force is being applied; and
5. while said force is being applied, allowing the liquified indium to solidify.

9. A method according to claim 8 wherein each of said intermediate films formed by depositing said copper therein on said exposed surface of the associated chromium film and by depositing said nickel therein on said copper thus deposited.

10. A method according to claim 8 wherein said respective gold films are applied in a thickness approximately double that of the respective intermediate films on whose exposed surfaces the gold films are applied.

11. A method according to claim 10 wherein the total thickness of said intermediate and gold films on said sapphire surface and the total thickness of said intermediate and gold films on said glass surface are each about 30,000 angstroms.

12. A method according to claim 11 wherein said chromium films on said sapphire and said glass surfaces are several hundred angstroms thick.

13. A method according to claim 10 wherein said step of applying heat to said sapphire, glass and indium wire is carried out with these materials located in a vacuum.

14. A method according to claim 12 wherein said step of applying heat to said sapphire, glass and indium wire is carried out with these materials located in a vacuum.

* * * * *